United States Patent
Hilliar et al.

(10) Patent No.: US 10,635,430 B2
(45) Date of Patent: *Apr. 28, 2020

(54) OVER-THE-AIR PROVISIONING OF APPLICATION LIBRARY

(71) Applicant: Visa International Service Association, San Francisco, CA (US)

(72) Inventors: Paul Hilliar, Bristol (GB); Brijendra Singh, Cupertino, CA (US); Mohamed Nosseir, Castro Valley, CA (US); Robert Youdale, Burlingame, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,242

(22) Filed: Oct. 30, 2018

(65) Prior Publication Data

US 2019/0065174 A1    Feb. 28, 2019

Related U.S. Application Data

(63) Continuation of application No. 15/666,791, filed on Aug. 2, 2017, now Pat. No. 10,146,528, which is a
(Continued)

(51) Int. Cl.
*G06F 8/65* (2018.01)
*G06F 8/71* (2018.01)
(Continued)

(52) U.S. Cl.
CPC ................ *G06F 8/65* (2013.01); *G06F 8/70* (2013.01); *G06F 8/71* (2013.01); *H04L 67/34* (2013.01);
(Continued)

(58) Field of Classification Search
CPC ....... H04L 63/0428; H04L 67/34; G06F 8/61; G06F 8/71; H04W 12/0023; H04W 12/02; H04W 12/12
(Continued)

(56) References Cited

U.S. PATENT DOCUMENTS 7,140,012 B2   11/2006   Pugh et al.
7,185,332 B1    2/2007   Waldin et al.
(Continued)

FOREIGN PATENT DOCUMENTS

| CN | 1346570 | 4/2002 |
|---|---|---|
| CN | 102163153 | 8/2011 |
| KR | 10 2014 0089703 | 7/2014 |

OTHER PUBLICATIONS

International Search Report dated Apr. 29, 2016 in PCT/US2015/067880, 11 pages.
(Continued)

*Primary Examiner* — Marina Lee
(74) *Attorney, Agent, or Firm* — Kilpatrick Townsend & Stockton LLP

(57) ABSTRACT

Techniques for updating an application installed on a communication device may include determining that an update for a private portion of the application is available at a server, sending a request for the update to the server, receiving an updated version of the private portion from the server, and installing the updated version of the private portion on the portable communication device without updating the public portion.

20 Claims, 8 Drawing Sheets

Related U.S. Application Data continuation of application No. 14/982,923, filed on Dec. 29, 2015, now Pat. No. 9,753,719.

(60) Provisional application No. 62/097,234, filed on Dec. 29, 2014.

(51) Int. Cl.
| | | |
|---|---|---|
| *G06F 8/70* | (2018.01) | |
| *H04W 12/00* | (2009.01) | |
| *H04W 12/02* | (2009.01) | |
| *H04W 12/12* | (2009.01) | |
| *H04W 4/50* | (2018.01) | |
| *H04W 4/60* | (2018.01) | |
| *H04L 29/08* | (2006.01) | |
| *H04L 29/06* | (2006.01) | |

(52) U.S. Cl.
CPC .............. *H04W 4/50* (2018.02); *H04W 4/60* (2018.02); *H04W 12/001* (2019.01); *H04W 12/0023* (2019.01); *H04W 12/02* (2013.01); *H04L 63/0428* (2013.01); *H04W 12/12* (2013.01)

(58) Field of Classification Search
USPC .................................................. 717/168–178
See application file for complete search history.

(56) References Cited

U.S. PATENT DOCUMENTS

| | | | |
|---|---|---|---|
| 8,560,823 | B1 | 10/2013 | Aytek |
| 8,600,896 | B2 | 12/2013 | Maeda et al. |
| 8,763,159 | B1 | 6/2014 | Kobets |
| 9,043,747 | B2 | 5/2015 | Eksten et al. |
| 9,124,650 | B2 * | 9/2015 | Maharajh ................. G06F 21/10 |
| 9,753,719 | B2 * | 9/2017 | Hilliar ........................ G06F 8/65 |
| 10,033,534 | B2 * | 7/2018 | Schulz ..................... H04L 9/304 |
| 10,146,528 | B2 * | 12/2018 | Hilliar ........................ G06F 8/65 |
| 2004/0153657 | A1 | 8/2004 | Fujiwara |
| 2006/0129846 | A1 | 6/2006 | Lambert |
| 2008/0229114 | A1 | 9/2008 | Okabe |
| 2009/0064125 | A1 | 3/2009 | Venkatachalam et al. |
| 2010/0048193 | A1 * | 2/2010 | Ortion ....................... G06F 8/60 |
| | | | 455/418 |
| 2010/0083241 | A1 | 4/2010 | Kobayashi |
| 2010/0175061 | A1 | 7/2010 | Maeda et al. |
| 2011/0040960 | A1 | 2/2011 | Deierling |
| 2011/0202751 | A1 * | 8/2011 | Kim ......................... G06F 21/10 |
| | | | 713/2 |
| 2011/0225417 | A1 * | 9/2011 | Maharajh ................. G06F 21/10 |
| | | | 713/150 |
| 2011/0258437 | A1 | 10/2011 | McKelvey et al. |
| 2012/0054734 | A1 | 3/2012 | Andrews |
| 2013/0103790 | A1 | 4/2013 | Gupta et al. |
| 2013/0227538 | A1 | 8/2013 | Mareuyama |
| 2013/0239089 | A1 | 9/2013 | Eksten et al. |
| 2014/0089202 | A1 | 3/2014 | Bond et al. |
| 2014/0229929 | A1 | 8/2014 | Miller |
| 2014/0237564 | A1 | 8/2014 | Dudziak et al. |
| 2014/0351584 | A1 * | 11/2014 | Checcucci ............ G06F 21/105 |
| | | | 713/164 |
| 2014/0372998 | A1 | 12/2014 | Salameh et al. |
| 2015/0193222 | A1 | 7/2015 | Pirzadeh et al. |
| 2016/0005042 | A1 * | 1/2016 | Tervo .................. G06Q 20/4014 |
| | | | 705/67 |
| 2016/0092870 | A1 * | 3/2016 | Salama ................ G06Q 20/367 |
| | | | 705/71 |
| 2016/0092871 | A1 * | 3/2016 | Gordon ............... H04L 63/0414 |
| | | | 705/44 |
| 2016/0103675 | A1 | 4/2016 | Aabye et al. |
| 2016/0210612 | A1 * | 7/2016 | Tervo .................. G06Q 20/3255 |
| 2019/0065174 | A1 * | 2/2019 | Hilliar ..................... H04W 4/50 |

OTHER PUBLICATIONS

Lorunser et al., "Security Processor with Quantum Key Distribution," 2008, pp. 37-42.
Nilsson et al., "Key Management and Secure Software Updates in Wireless Process Control Environments," 2008, pp. 100-108.
Nilsson et al., "Secure Firmware Updates Over the Air in Intelligent Vehicles," 2008, pp. 380-384.
Samuel et al., "Survivable Key Compromise in Software Update Systems," 2010, pp. 61-72.
Lewko et al., "How to Leak on Key Updates," 2011, pp. 725-734.
Magill et al., "Automating Object Transformations for Dynamic Software Updating," 2012, pp. 265-280.
Extended European Search Report, dated Jun. 26, 2018, in EP Application No. 15876174.2, 7 pages.
Boyen et al., Forward-Secure Signatures with Untrusted Update, pp. 191-200, 2006.
Seshadri et al., "SCUBA: Secure Code Update by Attestation in Sensor Networks," pp. 85-94, 2006.
Ding et al., "Model-Driven Application-Level Encryption for the Privacy of E-Health Data," pp. 341-346, 2010.
Poschmann et al., "Dynamic Code Update for the Efficient Usage of Security Components in WSNs," pp. 1-11, 2007.
Bettini et al., "Software Update via Mobile Agent Based Programming," pp. 32-36, 2002.
Nirmala et al., "Secure Program Update Using Broadcast Encryption for Clustered Wireless Sensor Networks," pp. 1-6, 2010.
European Search Report dated Aug. 19, 2019 for EP Application No. 19180508.4, 5 pages.
CN201580071469.7, "Office Action", dated Jan. 14, 2020, 17 pages.

\* cited by examiner

OVER-THE-AIR PROVISIONING OF APPLICATION LIBRARY

CROSS-REFERENCE TO RELATED APPLICATIONS

This application is a continuation of U.S. application Ser. No. 15/666,791, filed Aug. 2, 2017, which is a continuation of U.S. application Ser. No. 14/982,923, filed Dec. 29, 2015 and issued as U.S. Pat. No. 9,753,719, which is a non-provisional of and claims benefit to U.S. Provisional Patent Application No. 62/097,234, filed Dec. 29, 2014, all of which are herein incorporated by reference in their entireties for all purposes.

BACKGROUND

Hackers can develop malicious code (e.g., malware, viruses, etc.) to exploit vulnerabilities of a software application by studying the underlying functionalities of the application. This may involve reverse engineering the compiled code to obtain the source code of the application. One technique to combat hackers is to monitor the release of any malicious code, identify the security flaws exploited by the malicious code, and deploy a new version of the application to patch the security flaws. However, such a technique takes a reactive approach and does little to thwart a successful attack from happening in the first place.

Embodiments of the invention address this and other problems, individually and collectively.

BRIEF SUMMARY

In some embodiments, a portable communication device is provided that includes a processor and memory coupled to the processor. The memory stores instructions, which when executed by the processor, cause the portable communication device to perform operations including determining that an update for a private portion of a mobile application installed on the portable communication device is available at a server, sending a request for the update to the server, the request including a current private portion identifier associated with a current version of the private portion installed on the portable communication device, receiving an updated version of the private portion from the server that is encrypted using a current transport key embedded in the current version of the private portion installed on the portable communication device, decrypting the updated version of the private portion using the current transport key embedded in the current version of the private portion installed on the portable communication device, and installing the updated version of the private portion without updating a public portion of the mobile application.

In some embodiments, a method for updating a mobile application installed on a portable communication device is provided, wherein the mobile application includes a public portion and a private portion. The method may comprise determining, by the mobile application, that an update for the private portion is available at a server; sending a request for the update to the server, the request including a current private portion identifier associated with a current version of the private portion installed on the portable communication device; receiving an updated version of the private portion from the server that is encrypted using a current transport key embedded in the current version of the private portion installed on the portable communication device; decrypting the updated version of the private portion using the current transport key embedded in the current version of the private portion installed on the portable communication device; and installing the updated version of the private portion on the portable communication device without updating the public portion.

In some embodiments, a server for providing an update to a mobile application installed on a portable communication device is provided, wherein the mobile application includes a public portion and a private portion. The server comprises a processor and a memory coupled to the processor. The memory stores instructions, which when executed by the processor, cause the server to perform operations including receiving a request for an update to the private portion of the mobile application from the portable communication device, the request including a current private portion identifier associated with a current version of the private portion installed on the portable communication device, determining, based on the current private portion identifier, a current transport key that is associated with the current version of the private portion installed on the portable communication device, encrypting an updated version of the private portion using the current transport key, and transmitting the encrypted updated version of the private portion to the portable communication device without transmitting an update to the public portion of the mobile application.

DETAILED DESCRIPTION

Figure 1:
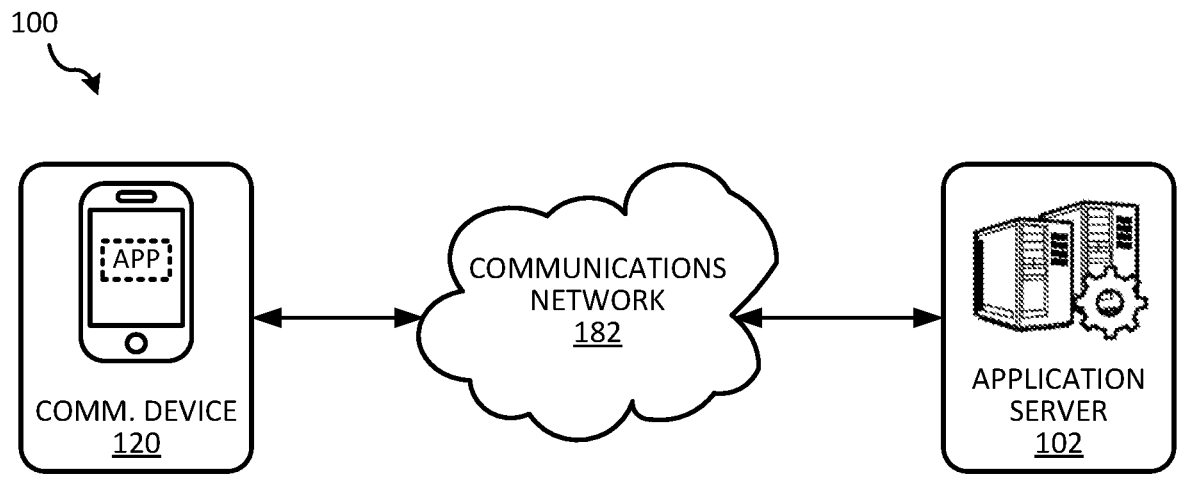
FIG. 1 illustrates a system for updating a mobile application installed on a portable communication device, according to some embodiments.

Embodiments of the present invention provide techniques for enhancing the security of a communication device (e.g., a portable communication device), and in particular, for enhancing the security of an application installed on a communication device. Hackers can develop malicious code (e.g., malware, viruses, etc.) to exploit vulnerabilities of a software application by reverse engineering the compiled code of an application and studying the underlying functionalities of the application. For example, hackers may reverse engineer a transaction application that uses and stores security sensitive information such as account numbers, and embed malicious code into the transaction application to implement a relay attack that sends a copy of account credentials to a remote site. However, it takes time for a hacker to reverse engineer and study a software application. As such, one way to thwart such attacks before they happen is to frequently release new versions of an application within the time that it may take for a hacker to reverse engineer a particular version of the application. For example, suppose it takes a hacker a month to reverse engineer a version of an application. In such a scenario, an application provider can release a new version of the application every three weeks such that by the time it takes a hacker to reverse engineer one version, a newer version of the application is already deployed. Any malicious code that is tailored to exploit an old version of the application may become useless on the new version of the application, because each version of the application uses a different source code base.

In the context of updating a mobile application installed on a portable communication device (e.g., a mobile device such as a smart phone, tablet, etc.), the traditional way to update a mobile application is for the application provider to upload a new version of an entire application to an application store (e.g., Google Play Store, Apple App Store, etc.). A user can then check the application store for a new version of the mobile application, download it, and install the updated version of the mobile application onto the portable communication device. However, updating an entire mobile application on a portable communication device can be time consuming due to the amount of data that needs to be downloaded over-the-air (e.g., via a wireless connection). Such an update process may also require a user to manually check the application store for updates and manually provide user approval before the mobile application can be updated. As such, a mobile application installed on a portable communication device may not always be the most up to date, for example, if the user fails to immediately check the application store when a new version becomes available.

In some embodiments, to reduce the amount of data that needs to be downloaded each time a mobile application is updated, a mobile application can be partitioned into multiple software layers. For example, a mobile application can be partitioned into two software layers such as a public portion and a private portion. The private portion can be a native library that is used to implement security sensitive functions (e.g., functions such as token request, account parameters replenishment, etc.), and can be written in a low level programming language such as C or C++. The private portion can be updated frequently to mitigate against hacking attempts. The public portion can be a software development kit (SDK) providing a set of public APIs that is used to implement non-secure functions (e.g., user interface related functions, external communication functions, etc.), and can be written in a higher level programming language such as Java. Because the security sensitive functions are not implemented in the public portion of the mobile application, a compromised public portion may be of little value to a hacker. As such, the public portion can be updated less frequently than the private portion, or not updated at all. As a result, most if not all of the frequent mobile application updates that occur can be performed by downloading and updating the private portion only and without downloading or modifying the public portion. Hence, the amount of data that needs to be downloaded for each update can be reduced.

In some embodiments, to help ensure that the private portion of the mobile application is up to date, the SDK of the mobile application may regularly or periodically contact a web service (e.g., a server) that hosts the mobile application updates. When appropriate, the web service may release a new private portion of the mobile application over-the-air to the portable communication device. If the web service determines that it is time to release a new private portion, the SDK of the mobile application downloads the new private portion to the local memory of the portable communication device, and dynamically loads the new private portion to update the mobile application. In this manner, the over-the-air updates of the mobile application can be deployed to a portable communication device without having to wait for a user to manually access an application store and/or to manually accept the update.

To further enhance the security of the update process and to prevent malicious code from obtaining sensitive information from the server, each version of the private portion of the application (e.g., each version of a native library) can be bound to a unique private portion identifier (ID) and a transport key associated with the private portion ID. When the private portion of the application communicates with the server (e.g., to obtain an application update or to perform secure sensitive functions such as token request or account parameters replenishment), the application may provide the server with the private portion ID. The server can then validate that the received private portion ID, look up the transport key that is associated with the private portion ID, and encrypt the information sent to the application using the transport key. A hacked application will likely not have a valid private portion ID, and will likely not have access to a valid transport key to decrypt the information received from the server.

Prior to discussing the details of some embodiments of the present invention, description of some terms may be helpful in understanding the various embodiments.

A "communication device" may be a device that includes one or more electronic components (e.g., an integrated chip) that can communicate with another device. For example, a communication device can be a computing device that includes at least one processor coupled to a memory that stores instructions or code for execution by the processor. A "portable communication device" may be a communication device that can be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, health monitoring device such as a fitness tracker, etc.), electronic reader device, laptops, netbooks, ultrabooks, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or transaction processing network, and for interacting with a transaction device (e.g., a payment device), a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a transaction processing network and/or an issuer of a transaction card (e.g., a payment card). An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

A "token" may include a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "limited-use key" or "LUK" may refer to a key that can be used for only a limited time or a limited number of transactions, and may need to be renewed or replenished when the limited usage has been exhausted. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds may include at least one of a number of transactions that the LUK can be used for, a time-to-live indicating the duration of time for which the LUK is valid, and/or a cumulative transaction amount indicating the total transaction amount summed across one or more transactions for which the LUK is valid, or any combination thereof.

A "limited-use threshold" may refer to a condition that limits the usage of a piece of information. A limited-use threshold may be exceeded or exhausted when the underlying condition is met. For example, a limited-use threshold may include a time-to-live that indicates an amount of time that a piece of information is valid for, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Details of some embodiments of the present invention will now be described.

FIG. 1 illustrates a system 100 for updating an application installed on a communication device, according to some embodiments. System 100 includes an application server 102 and a portable communication device 120 (e.g., a mobile device such as a mobile phone) in communication with each other, for example, via a communications network 182. A communication device according to some embodiments is described further herein with respect to FIG. 2 and FIG. 6. An application server according to some embodiments is described further herein with respect to FIG. 3.

Any suitable number or types of communication networks may be present between the portable communication device 120 and the application server 102, as well as between any other suitable combination of entities in FIG. 1. A communications network such as communications network 182 may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

It is noted that the components or elements illustrated in FIG. 1 are for illustration purposes, and that certain blocks can be combined or functions may be separated into other computational components in other embodiments of the invention.

Figure 2:
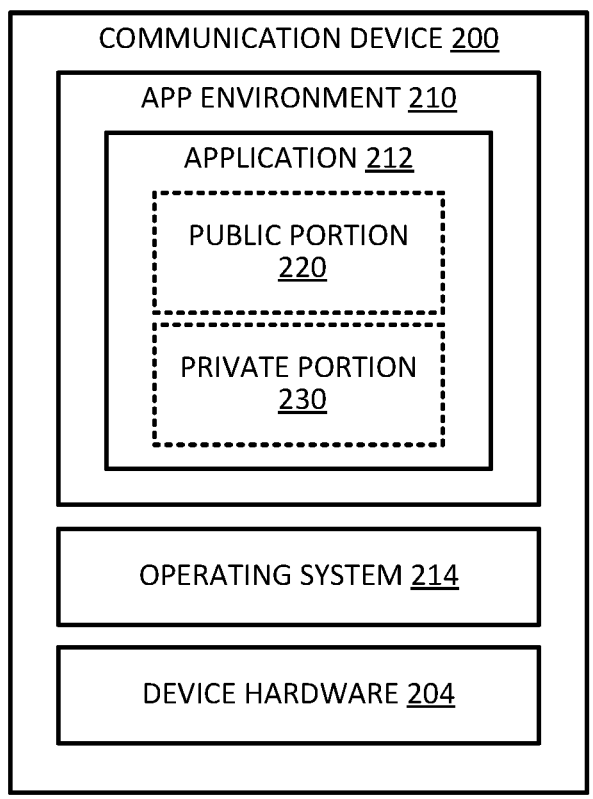
FIG. 2 illustrates a block diagram of an example of a communication device, according to some embodiments.

FIG. 2 illustrates a communication device 200, according to some embodiments. Communication device 200 may include device hardware 204 such as one or more processors, an operating system 214, and an application 212 running on communication device 200. In some embodiments, application 212 can be executing within an application environment 210 such as a virtual machine.

Application 212 may include multiple software layers or software libraries. For example, application 212 may include public portion 220 and private portion 230. Public portion 220 and private portion 230 can be provided by the same developer or be provided by different entities. In some embodiments, public portion 220 and private portion 230 can be written in the same or different programming languages. For example, public portion 220 can be written in a high level programming language. Private portion 230 can be written in a low level programming language. In some embodiments, private portion 230 can be a native library that can be shared amongst various applications executing in application environment 210. In some embodiments, private portion 230 can be bound to public portion 220, and is only accessible by public portion 220. Public portion 220 can communicate with private portion 230 to exchange data and invoke functions implemented in private portion 230, and vice versa, via an interface between the two software layers.

In some embodiments, operating system 214 can be a mobile operating system, such as Android. Public portion 220 can be written in Java, and private portion 230 can be written in C or C++. In such embodiments, the interface between public portion 220 and private portion 230 can be a Java Native Interface (JNI). During compilation of application 212, the public portion 220 source code can be compiled using a Java compiler such as Javac into Java class files. The C or C++ code headers which allow public portion 220 to call functions in private portion 230 can be generated by a header file generator such as Javah. The native C or C++ private portion 230 source code can be compiled and linked to the header files to form a shared object (.so) dynamic library file. The Java class files and the dynamic library file can be packaged and compressed into an application package file (e.g., an Android application package (.apk) file). This application package file can be downloaded from an application store onto portable communication device 200, and is used initially to install application 212 onto portable communication device 200. In some embodiments, installing application 212 will instantiate a virtual machine instance such as a Dalvik virtual machine instance from which application 212 will execute.

In some embodiments, application 212 can be an application that uses or processes sensitive data. For example, application 212 may use certain sensitive data assets such as encryption keys to perform cryptographic operations, or may access or use sensitive information such as personal or financial information (e.g., account credentials). Functions related to the processing of sensitive data (which may be referred to as security-sensitive functions) can be implemented in the private portion 230 of application 212, whereas basic functions such as the user interface and external communications (e.g., networking) functionalities can be implemented in the public portion 220 of application 212. Due to the modularized nature of application 212, without proper safeguards, the private portion 230 implementing the security-sensitive functions can be susceptible to hacking attempts that seek to compromise the underlying sensitive information. For example, the shared object (.so) dynamic library file implementing the private portion 230 can be extracted directly from the application package file, or from an installed version of application 212 on a device. The dynamic library file can then be disassembled to reverse engineer the code, and a malicious application can be created to exploit the vulnerabilities of the code. For example, a malicious application can be deployed on an unsuspecting device, and can be executed to access sensitive data and perform security-sensitive functions to send sensitive information to an unauthorized party.

Figure 3:
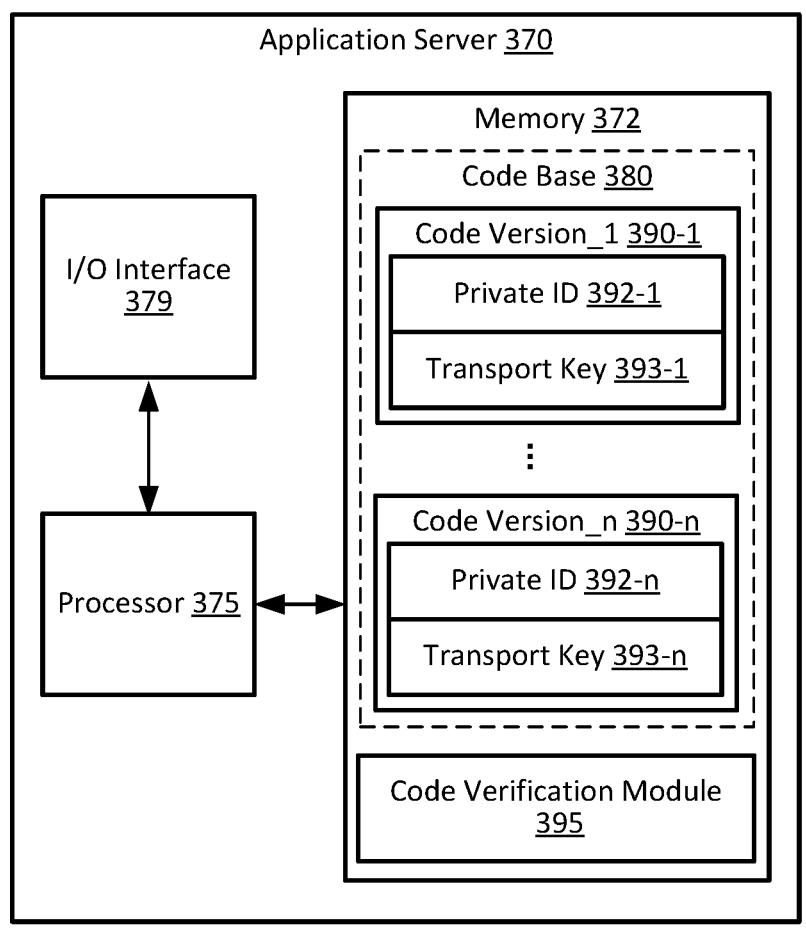
FIG. 3 illustrates a mobile application server, according to some embodiments.

FIG. 3 illustrates a block diagram of some components of an application server 370 according to some embodiments. The application server 370 may include a processor 375, which is operatively coupled to a memory 372 and an I/O interface 379. Memory 372 may store a code verification module 395 and may also maintain a code base 380. It should be noted that in some embodiments, instead of maintaining code base 380 locally within memory 372, the application server 370 can be coupled to a separate database that maintains such a code base. Code verification module 395 can be configured to verify whether a private portion of the application installed in a communication device is up to date, for example, by comparing the private portion ID received from an application installed on a communication device to the private portion ID of the most-recently released binary in code base 380.

Code base 380 may include a stack of built binaries 390-1 to 390-n corresponding to different versions of the private portion of an application, and may include any number of binaries that have been released and any number of binaries that are waiting to be released. The application provider associated with the application server 372 may decide when to release each version of the binary. In some embodiments, the release of the different versions can be performed periodically (e.g., a new version is released every two weeks, every month, every quarter, etc., or at a time interval having a duration less than the estimated amount of time it takes to reverse engineer the binary of the private portion of the application).

In some embodiments, each of the binaries 390-1 to 390-n can be built with a different obfuscation seed to obfuscate the source code such that even if a hacker is able to reverse engineer one binary, the hacker must start the reverse engineering process again when attacking a different binary. Various obfuscation techniques can be applied to obfuscate the source code such that no two code versions look the same, even when the underlying functionalities implemented by the code are the same. For example, variable names in the source code can be replaced with random characters, white space can be added into the source code to hide the underlying code structure, code sections can be rearranged, dummy code can be introduced, or any combination of such techniques can be employed. An obfuscation seed can be used to direct which character is replaced with which random character, where in the source code white spaces are introduced, how the code sections are rearranged, and/or where dummy code is injected. An obfuscation seed can also be used to direct which combination of obfuscation schemes is employed for a particular version. By using a different obfuscation seed for each code version, the same underlying source code can result in any number of different obfuscated codes that can be released over time to thwart reverse engineering attempts. Thus, in some embodiments, the current version of the private portion of the application currently installed on a communication can be obfuscated using a first obfuscation seed, while the next release or the updated version of the private portion can be obfuscated using a second obfuscation seed that is different than the first obfuscation seed. This may further deter hackers from reverse engineering the private portion of the application.

Each of the binaries 390-1 to 390-n may be associated with its own unique private portion ID 392 and a transport key 393 that are bound to the particular version of the binary. The private portion ID 392 and transport key 393 can be embedded in the binary, and be provided to a communication device when the communication device downloads the binary. In some embodiments, different versions may embed the transport key 393 at different locations in the binary. Similarly, different versions may also embed the private portion ID 392 at different locations in the binary. The transport key 393 can be used to encrypt communications between the application server 370 and the particular version of the private portion binary installed on a communication device. The application server 370 may maintain a mapping between each private portion ID 392 and its associated transport key 393, such that the application server 370 can retrieve the appropriate transport key 393 based on a private portion ID received from a communication device when communicating with the application installed on the portable communication device.

Figure 4:
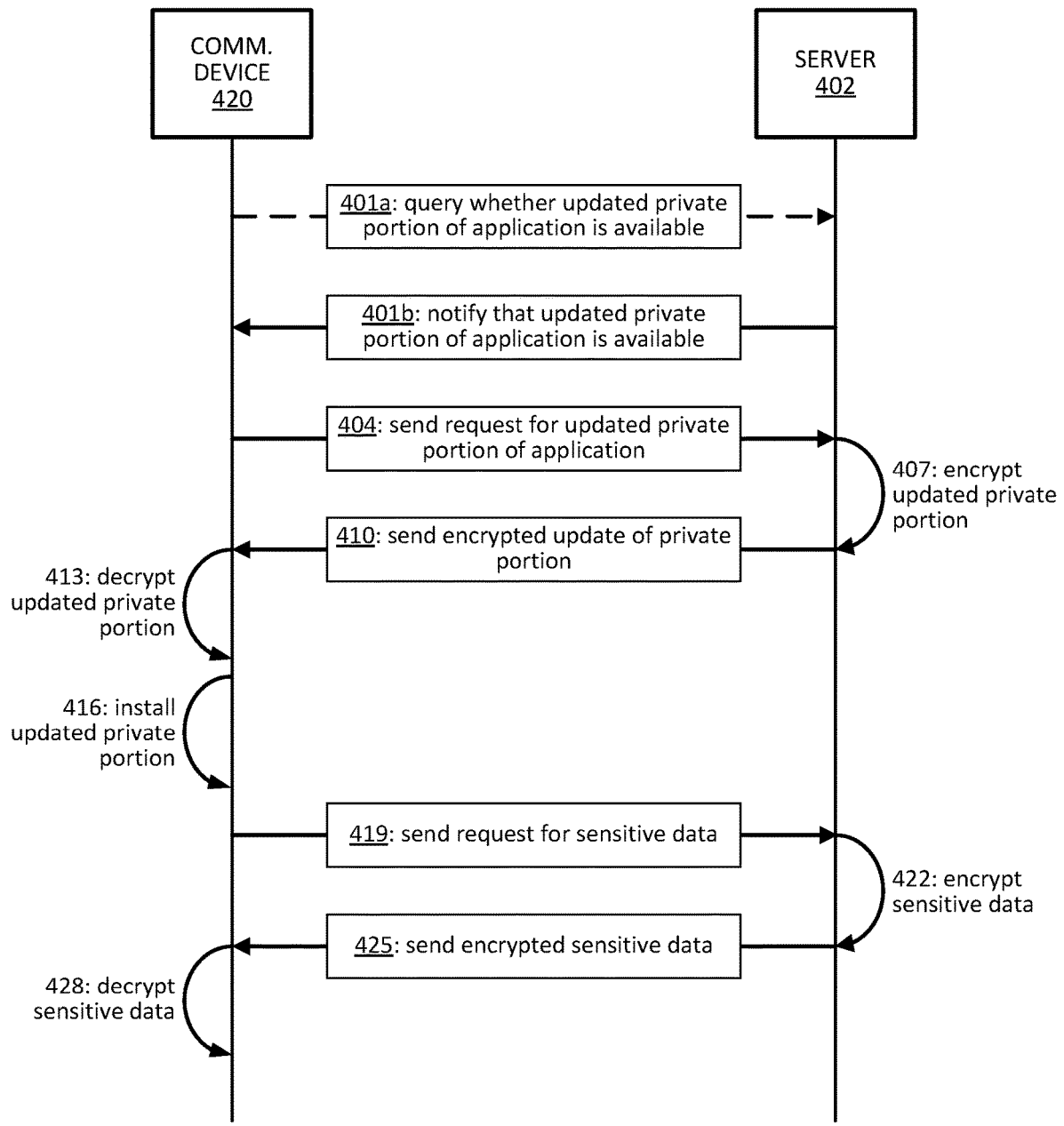
FIG. 4 illustrates a flow diagram for a process of updating a mobile application installed on a portable communication device, according to some embodiments.

FIG. 4 illustrates a flow diagram for a process of updating an application installed on a communication device 420 that can be performed between communication device 420 and server 402, according to some embodiments. At optional step 401a, communication device 420 may contact the server 402 to query whether the current application installed on communication device 420 is up-to-date. Communication device 420 may contact server 402 periodically, for example. At step 401b, the server 402 sends a message to communication device 420 notifying communication device 420 that an update for a private portion of the application is available. In some embodiments, the notification in step 401b can be sent in response to receiving the query of step 401a. In some embodiments, the notification in step 401b can be a push notification that is sent when an update becomes available and is ready to be released. In such embodiments, the push notification can be sent without receiving a query from communication device 420.

At step 404, communication device 420 sends a request for the update to server 402 in response to receiving the notification in step 401b. The request may include a current private portion identifier (ID) associated with a current version of the private portion installed on communication device 420. At step 407, server 402 determines, based on the current private portion ID received from communication device 420, a current transport key that is associated with the current version of the private portion installed on communication device 420, and encrypts an updated version of the private portion using the current transport key. For example, server 420 may look up the received private portion ID in the server's code base to identify the code version currently installed on communication device 420, and retrieve the transport key associated with that code version. At step 410, server 402 transmits the encrypted updated version of the private portion to communication device 420. The updated version of the private portion can be transmitted without transmitting the public portion of the application.

At step 413, communication device 420 decrypts the updated version of the private portion using the current transport key embedded in the current version of the private portion installed on communication device 420. At step 416, communication device 420 installs the updated version of the private portion on communication device 420 without updating the public portion of the application.

At step 419, subsequent to installing the updated version of the private portion, communication device 420 may send a request to server 402 for sensitive data. The request may include an updated private portion identifier associated with the updated version of the private portion installed on communication device 420. At step 422, server 402 can look up the updated transport key associated with updated version of the private portion installed on communication device 420 based on the received updated private portion identifier, and encrypt the sensitive data using the updated transport key. At step 425, server 402 transmits the encrypted sensitive data to communication device 420. At step 428, communication device 420 decrypts the sensitive data using the updated transport key embedded in the private portion of the application installed on communication device 420.

In some embodiments, instead of encrypting the sensitive data directly with the updated transport key, the sensitive data can be encrypted using a one-time key that is generated from the transport key. For example, the sensitive data can be transmitted to communication device 420 in a message that includes a header and a payload containing the sensitive data, and the sensitive data can be encrypted by server 402 using a one-time key that is generated by encrypting the header or a portion thereof with the updated transport key. In such embodiments, when communication device 420 receives the message, communication device 420 can generate its own copy of the one-time key by encrypting the header with the updated transport key, and then decrypt the sensitive data with the one-time key.

In some embodiments, the sensitive data can be encrypted using a derived key that is derived from the updated transport key and a key derivation seed. For example, server 402 may provide a key derivation seed to communication device 420 when the application or the updated private portion is downloaded to communication device 420. Server 402 may maintain a copy of the key derivation seed. When server 402 sends sensitive data to communication device 420, server 402 may generate a derived key using the updated transport key and the key derivation seed. The derived key can be generated by combining the key derivation seed with the updated transport key in a key derivation function. For example, the key derivation function can be a mathematical (e.g., addition, multiplication, etc.) or logical (e.g., XOR, XNOR, etc.) operation that takes key derivation seed and the updated transport key as operands to generate the derived key. As another example, the key derivation function can be a hash algorithm that is computed over the updated transport key as the input data, and key derivation seed can be used as a salt value for the hash algorithm (or vice versa) to generate the derived key. As a further example, the key derivation function can be an encryption algorithm that encrypts the key derivation seed using the updated transport key as the encryption key (or vice versa) to generate the derived key. In some embodiments, the key derivation function can be a combination of one or more mathematical or logical operations, hash algorithm, and/or encryption algorithm. For example, the key derivation function can be an encryption algorithm that is applied to the result of applying a logical operation to the key derivation seed and updated transport key. When communication device 420 receives the encrypted sensitive data, communication device 420 can generate its own copy of the derived key using the updated transport key and the key derivation seed previously received from server 402, and then decrypt the sensitive data with the derived key.

It should be understood that with each new update of the private portion, communications between the server and the communication device can be encrypted/decrypted using the latest transport key embedded in each update of the private portion. In this manner, even if the transport key associated with one version of the private portion is compromised, that compromised transport key cannot be used once a new version of the private portion is deployed.

It should also be understood that although the description provided herein specifically refers to updating the private portion of an application, the same techniques can be used to update the public portion of an application, or any software layer (e.g., software library) of an application that can be separately updated.

Figure 5:
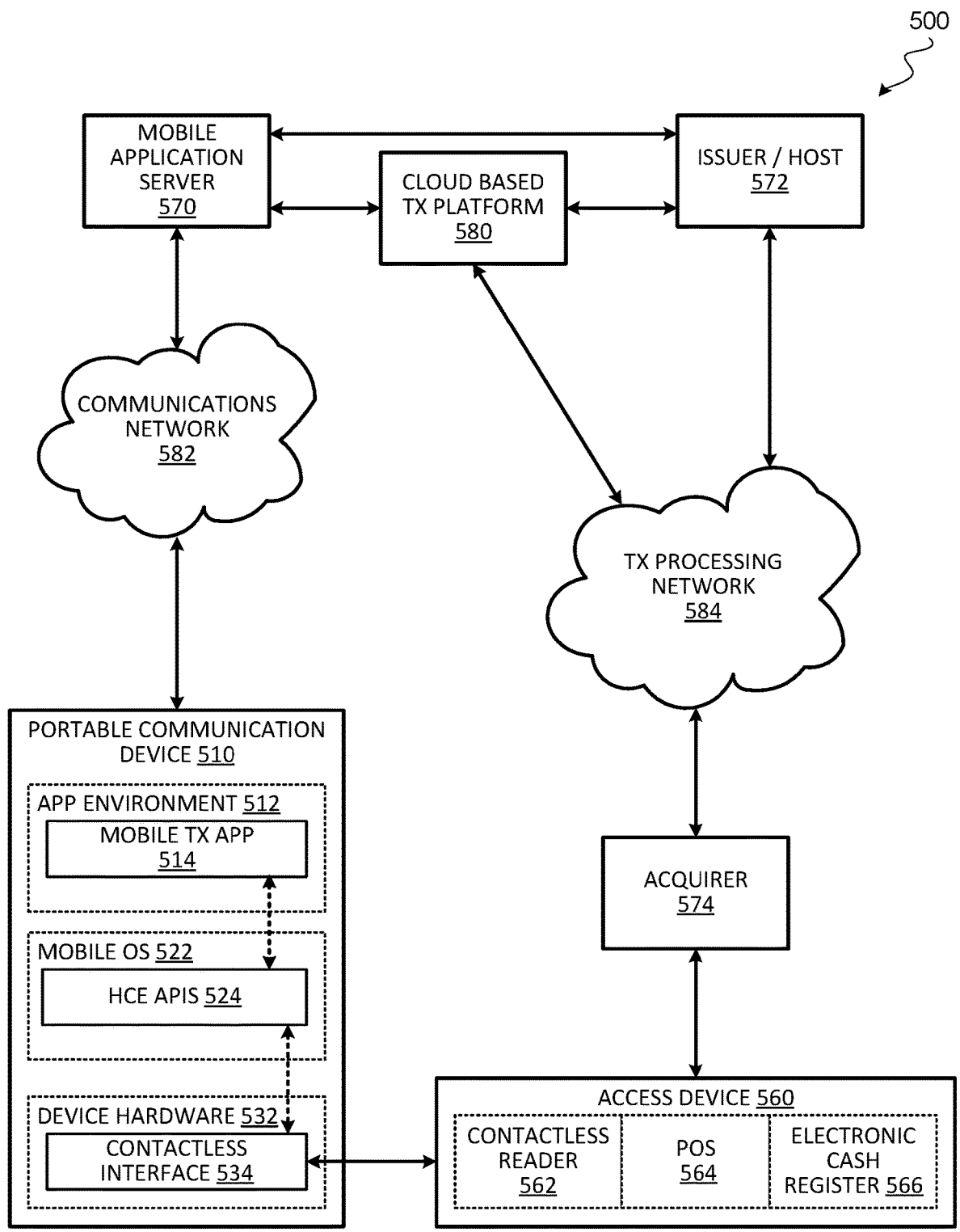
FIG. 5 illustrates a block diagram of an example of a transaction system, according to some embodiments.

FIG. 5 illustrates a block diagram of an exemplary system 500 in which the techniques described herein can be used, according to some embodiments. System 500 can be, for example, a cloud-based transaction system for conducting cloud-based transactions. System 500 includes a portable communication device 510 (e.g., a mobile device), a cloud-based transaction platform (CBP) 580, and a mobile application platform (MAP) 570. CBP 580 may be implemented using one or more computing devices (e.g., computers, servers), and can be associated with or operated by an issuer, transaction processor, and/or other suitable entities. CBP 580 implements a set of functionalities including account management, and account parameters generation and replenishment to enable cloud-based transactions to be conducted via portable communication device 510. MAP 570 is used to facilitate communications between CBP 580 and mobile application 514 (e.g., a transaction application) in portable communication device 510. MAP 570 may be implemented using one or more computing devices (e.g., computers, servers), and can be associated with or operated by the service provider of mobile application 514 (e.g., mobile software application), such as an issuer, a mobile wallet provider, a merchant, and/or other suitable entities. In some embodiments, MAP 570 can be associated with or operated by the same entity as CBP 580, or they can be separate. MAP 570 is used to intermediate requests between the mobile application 514 and CBP 580, and to ensure that requests and responses initiated by either party are fulfilled once connectivity to portable communication device 510 is established, for example, via a communications network 582 (e.g., internet, mobile or cellular network, etc.). It should be understood that in some embodiments, one or more functionalities of CBP 580, MAP 570, and/or issuer or host processing system 572, may be integrated into the same computing device or different computing devices.

Portable communication device 510 can be used to conduct cloud-based transactions facilitated by CBP 580 and/or MAP 570. Portable communication device 510 includes device hardware 532, mobile operating system (OS) 522, and applications environment 512. Device hardware 532 includes a contactless interface 534 that can contactlessly communicate or otherwise present information to another device such as a contactless reader 562 of an access device 560. Examples of contactless interface 534 can include a near-field communications (NFC) interface that can send and receive communications using radio frequency, or other wireless communication protocols such as Bluetooth, Bluetooth Low Energy (BLE), Wi-Fi, etc. Examples of contactless interface 534 may also include an optical interface such as a display to present information such as quick response (QR) codes, bar codes, etc.

Applications environment 512 of portable communication device 510 may include a mobile application 514 such as a transaction application provided by a service provider. For example, if the service provider of mobile application 514 is an issuer, mobile application 514 implementing a transaction application may be a mobile banking application or a mobile payment application. If the service provider is a mobile wallet provider such as a mobile network operator or third-party wallet provider that supports multiple issuers, mobile application 514 implementing a transaction application may be a mobile wallet application. For merchants, mobile application 514 may be a merchant's own transaction application from which consumers can conduct e-commerce or point of sale transactions, or a mobile wallet application supporting multiple merchants.

In some embodiments, mobile application 514 may include on-device cloud-based transaction logic integrated into mobile application 514 to support cloud-based transactions. The on-device cloud-based transaction logic performs functions to facilitate cloud-based transactions such as to take account parameters provided for use in transactions and deliver them to mobile operating system 522 for transmission over contactless interface 534. For example, the on-device cloud-based transaction logic may use a cryptogram key (e.g., a limited-use key) provisioned from CBP 580 to generate a transaction cryptogram that is transmitted over contactless interface to access device 560 to conduct a transaction. The transaction cryptogram can be sent over to the transaction processing network 584 to obtain authorization for the transaction. The on-device cloud-based transaction logic also manages the initial service profile parameters that are provided after an account has been provisioned to ensure that requests for account parameter replenishment and other account parameter management activities are initiated.

To provision portable communication device 510 for cloud-based transactions, CBP 580 can be used to configure account portfolios associated with issuers and to provide portable communication device 510 with account parameters for use when conducting cloud-based transactions. The account portfolios established by CBP 580 can include characteristics such as risk parameters (e.g., velocity controls) that manages the triggers of when account parameters on a provisioned device will need to be refreshed for accounts in each portfolio. To ensure consistent performance and usability, a set of minimum parameters configurable in a service profile can be implemented by CBP 580. To ensure that cloud-based transactions are processed according to the rules specified in the service profile for an account portfolio, CBP 580 performs various core functions during the lifetime of an account that has been enabled. These functions can include provisioning, active account management, verification for transaction, transaction processing, lifecycle management and post-transaction.

CBP 580 may create a service profile for a portfolio before an account is provisioned as a cloud-based account. Provisioning may include taking an enrolled account, create account information such as an alternate Primary Account Number (PAN) or a token acting as a PAN substitute, and inheriting service profile has been established for the portfolio. Once an account is provisioned, the relevant service profile details are shared with both the transaction processing and the on-device cloud-based transaction logic in order to ensure that decision making can be done at transaction processing and during mobile application usage by the consumer.

Once an account is provisioned, active account management can be performed by CBP 580. Active account management can be initiated either from transaction processing activity or from mobile application activity. After the account has been provisioned, the active account management capability generates the initial set of account parameters to be deployed to portable communication device 510. The account parameters may include account information generated during provisioning (e.g., alternate PAN or token), as well as dynamic information to ensure the set of account parameters have only a limited use once delivered to the device. Dynamic information may include limited use cryptogram keys or dynamic data depending on what type of transaction is being supported. For example, the dynamic information may include limited use cryptogram keys to calculate cryptograms, as well as limited use dynamic data to support legacy dynamic card verification value or code based implementations.

During transaction processing, if the service profile parameters maintained by CBP 580 for a particular account indicate that account parameters on portable communication device 510 need to be replaced, the active account management capability of CBP 580 may connect to portable communication device 510 via MAP 570 to replenish account parameters. Likewise, if the on-device service profile parameters stored on portable communication device 510 indicate that account parameter replenishment is needed or is close to be being needed (i.e., by monitoring account parameter thresholds), then mobile application 514 can make a request to CBP 580 for account parameter replenishment.

Once portable communication device 510 has been provisioned to conduct cloud-based transactions, transactions can be conducted via portable communication device 510 by interacting with a contactless reader 562 of an access device 560 (e.g., at a merchant location). Components of access device 560 may include point-of-sale (POS) terminal 564 and/or electronic cash register 566. Access device 560 can be coupled to acquirer 574 (e.g., via a merchant computer not shown). Acquirer 574 may be connected to an issuer or host processing system 572 via transaction processing network 584. Transaction processing network 584 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. Transaction processing network 584 may use any suitable wired or wireless network, including the Internet.

Transaction processing network 584 may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Each of the entities (e.g., acquirer 574, transaction processing network 584, issuer or host processing system 572) may comprise one or more computers or servers to enable communications, or to perform one or more of the functions described herein.

To conduct a cloud-based transaction, a user of portable communication device 510 may tap portable communication device 510 against contactless reader 562 (e.g., via NFC) of access device 560, or display an image such as a bar code or QR code on a screen of portable communication device 510 that can be scanned by contactless reader 562 (e.g., an optical scanner or reader) of access device 560. In some embodiments, portable communication device 510 may provide access device 560 with an account identifier (e.g., an alternate PAN, a token, etc.) and additional information such as limited-use account parameters or information derived from the limited-use account parameters. For example, an account identifier and/or additional information (e.g., transaction cryptogram) can be encoded in a bar code or QR code that is scanned by access device 560, or the account identifier and/or additional information can be transmitted to access device 560 via NFC. In some embodiments, the limited-use account parameters may include a transaction cryptogram.

Access device 560 or a merchant computer coupled to access device 560 may generate an authorization request message including the account identifier and additional information (e.g., limited-use account parameters, or information derived from the limited-use account parameters), and forward the authorization request message to acquirer 574. The authorization request message is then sent to transaction processing network 584. Transaction processing network 584 then forwards the authorization request message to the corresponding issuer or host processing system 572 associated with an issuer of the account associated with portable communication device 510.

After issuer or host processing system 572 receives the authorization request message, the authorization request message may be parsed, and information in the authorization request message may be sent to CBP 580 for verification. An authorization response message is then sent back to transaction processing network 584 to indicate whether the current transaction is authorized (or not authorized). Transaction processing network 184 then forwards the authorization response message back to acquirer 574. In some embodiments, transaction processing network 584 may decline the transaction even if issuer or host processing system 572 has authorized the transaction, for example depending on a value of a fraud risk score or depending if limited-use account parameters are verified by CBP 580. Acquirer 574 then sends the authorization response message to the merchant computer and/or access device 560. The authorization response results may be displayed by access device 560, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by transaction processing network 584. A clearing process is a process of exchanging financial details between an acquirer and an issuer to facilitate posting to a customer's transaction account and reconciliation of the user's settlement position.

Figure 6:
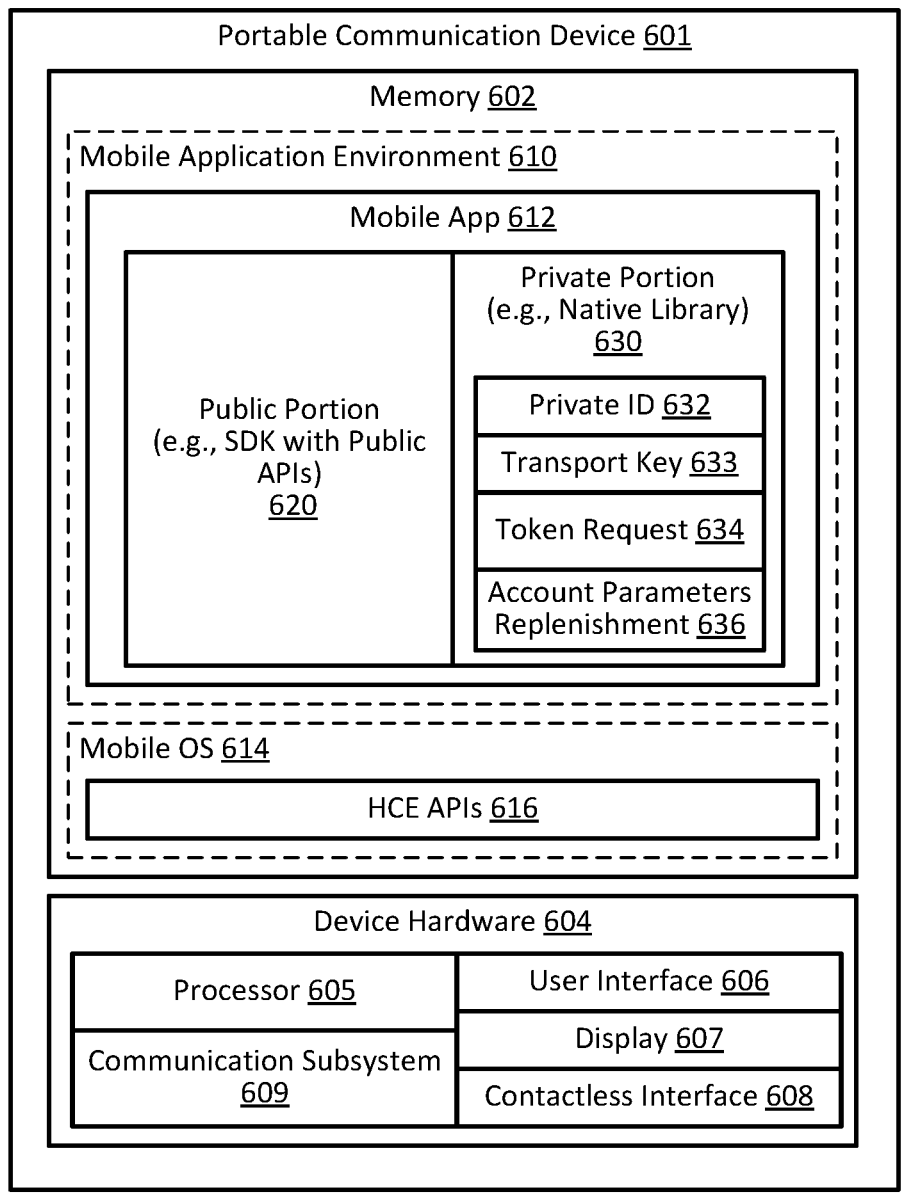
FIG. 6 illustrates a portable communication device, according to some embodiments.

FIG. 6 illustrates a block diagram of a portable communication device 601, according to some embodiments. Portable communication device 601 may include device hardware 604 coupled to a memory 602. Device hardware 604 may include a processor 605, a communications subsystem 609, user interface 606, a display 607 (which may be part of user interface 606), and a contactless interface 608. Processor 605 can be implemented as one or more integrated circuits (e.g., one or more single core or multicore microprocessors and/or microcontrollers), and is used to control the operation of portable communication device 601. Processor 605 can execute a variety of programs in response to program code or computer-readable code stored in memory 602, and can maintain multiple concurrently executing programs or processes. Communications subsystem 609 may include one or more RF transceivers and/or connectors that can be used by portable communication device 601 to communicate with other devices and/or to connect with external networks (e.g., communication network 182). User interface 606 can include any combination of input and output elements to allow a user to interact with and invoke the functionalities of portable communication device 601. In some embodiments, display 607 may be part of user interface 606.

Contactless interface 608 may include one or more RF transceivers to interact with a contactless reader of an access device to conduct a transaction (e.g., payment transaction, access transaction, information exchange, etc.). In secure element based implementations, only a secure element (not shown) may have access to contactless interface 608. In some embodiments, contactless interface 608 can be accessed by the mobile OS 614 using card emulation APIs 616 without requiring the use of a secure element. In some embodiments, display 607 can also be part of contactless interface 608, and is used, for example, to perform transactions using QR codes, bar codes, etc.

Memory 602 can be implemented using any combination of any number of non-volatile memories (e.g., flash memory) and volatile memories (e.g., DRAM, SRAM), or any other non-transitory storage medium, or a combination thereof media. Memory 602 may store a mobile OS 614 and a mobile application environment 610 where one or more mobile applications reside including mobile application 612 (e.g., a payment application such as a mobile wallet application, merchant application, etc.) to be executed by processor 605. In some embodiments, mobile OS 614 may implement a set of card emulation APIs 616 that can be invoked by mobile application 612 to access contactless interface 608 to interact with an access device.

According to some embodiments, mobile application 612 can be partitioned into a private portion 630 (e.g., a native or private library) that is frequently updated, and a public portion 620 (e.g., a software development kit (SDK) providing public APIs) that is updated less frequently than the private portion or not updated at all. Public portion 620 may include a set of public APIs that is used to implement non-security sensitive functions such user interface functions, as well as functions that may invoke security sensitive functions implemented in the private portion 630. The public portion 620 can be written in a high level programming language such as Java. The private portion 630 may include a native library to implement security-sensitive functions such as token request 634, account parameters replenishment 636, etc. The private portion 630 may be written in a low level programming language such as C or C++. The source code of the private portion 630 can be obfuscated to mask the source code and the underlying functionalities implemented in the private portion 630.

In some embodiments, security sensitive communications between the mobile application 612 and a mobile application server (e.g., to obtain software updates, request a token, request account parameters replenishment, etc.) can be carried out with the private portion 630 of the mobile application 612. To further enhance the security of mobile application 612, the private portion 630 of the mobile application 612 may include a unique private portion ID 632 that is bound to the particular version of the private portion 630, and a transport key 633 associated with the private portion ID 632. The private portion ID 632 and transport key 633 can be embedded in the binary code of the private portion 630. Whenever the mobile application 612 communicates with the mobile application server (e.g., to request sensitive information such as a token or account parameters from the mobile application server), the mobile application can send the private portion ID 632 from the private portion 630 to the mobile application server for verification. The private portion ID 632 can be verified by the mobile application server, and the communications between mobile application 612 and the mobile application server can be encrypted using the transport key 633 associated with the private portion ID 632.

Various types of encryption using the transport key 633 can be implemented. In some embodiments, the communications between mobile application 612 and the mobile application server can be encrypted by the transport key 633 itself. In some embodiments, at the start of each communication session, a one-time key can be generated by encrypting the first bytes of a message (e.g., can be part of the header of a message) using the transport key 633, and the data portion of the message can be encrypted by this one-time key. In some embodiments, a key derivation seed can be combined with the transport key 633 to generate a derived key, and the communications can be encrypted by this generated derived key.

Figure 7:
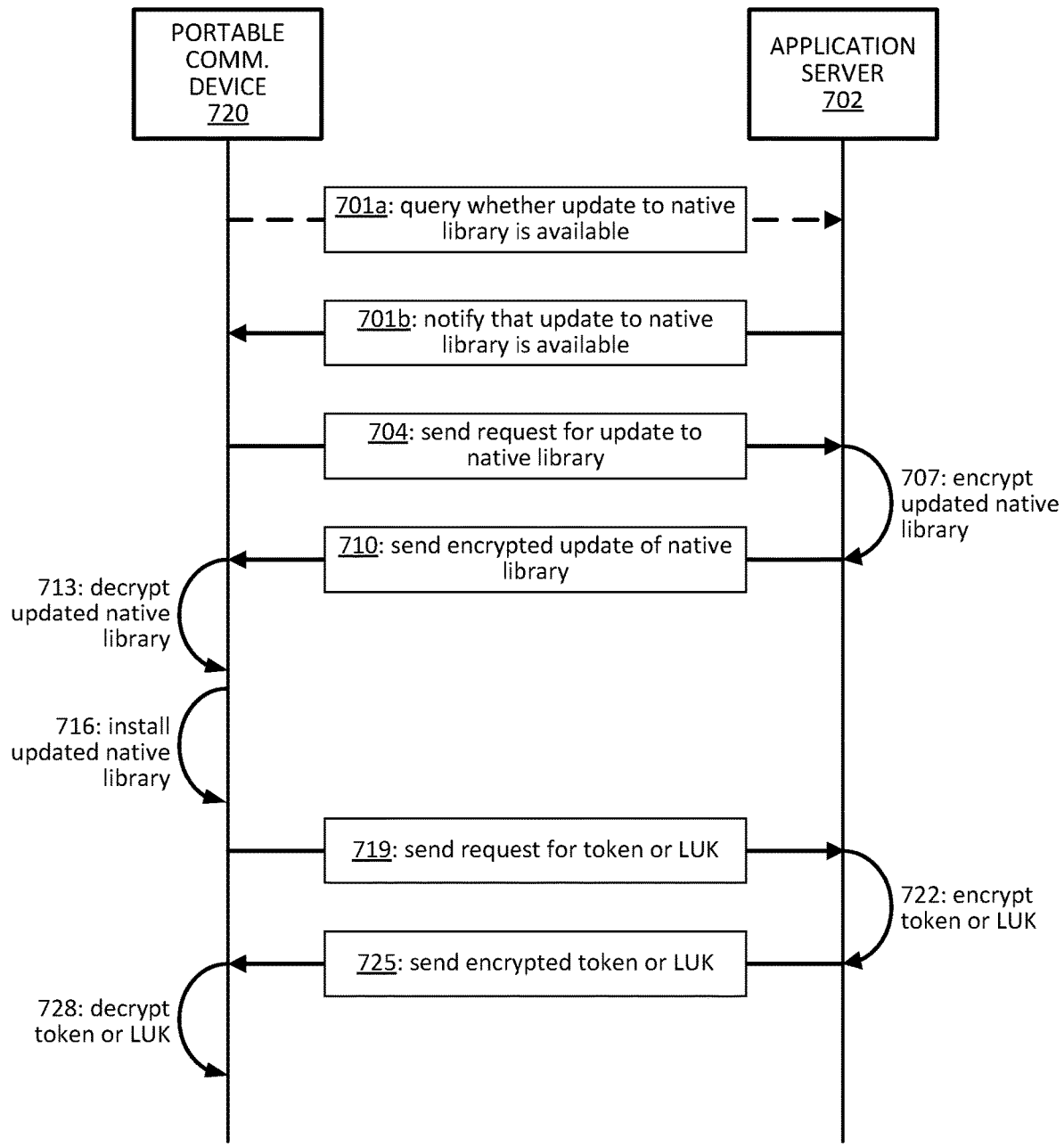
FIG. 7 illustrates a flow diagram for a process of updating a mobile application installed on a portable communication device, according to some embodiments.

FIG. 7 illustrates a flow diagram for a process of updating a mobile application installed on a portable communication device 720 in a transaction context, according to some embodiments. At optional step 701*a*, portable communication device 720 contacts the server 702 to verify whether the current mobile application installed on portable communication device 720 is up-to-date. Portable communication device 720 may contact server 702 periodically, for example. At step 701*b*, the server 702 sends a notification message to portable communication device 720 notifying portable communication device 720 that an update for a native library of the mobile application is available. In some embodiments, the notification message can be a push notification that server 702 sends when a new update is available for download.

At step 704, portable communication device 720 sends a request for the update to server 702. The request includes a current private portion identifier associated with a current version of the native library installed on portable communication device 720. At step 707, server 702 determines, based on the current private portion identifier, a current transport key that is associated with the current version of the native library installed on portable communication device 720, and encrypts an updated version of the native library using the current transport key. At step 710, server 702 transmits the encrypted updated version of the native library to portable communication device 720 without transmitting an update to the SDK of the mobile application.

At step 713, portable communication device 720 decrypts the updated version of the native library using the current transport key embedded in the current version of the native library installed on portable communication device 720. At step 716, portable communication device 720 installs the updated version of the native library on portable communication device 720 without updating the SDK of the mobile application.

At step 719, subsequent to installing the updated version of the native library, portable communication device 720 may send a request to server 702 for a token or limited-use key (LUK). The token and the LUK are used by the mobile application to conduct transactions. For example, the token can be used as a substitute for an account identifier, and the LUK can be used to encrypt transaction data received from an access device to generate a transaction cryptogram. In some embodiments, the LUK can only be used for a limited number of transactions or limited amount of time, and portable communication device 720 may send a request to server 702 to replenish the LUK once the LUK expires or is about to expire. A request for a token can be sent during provisioning of the mobile application, or when renewal of the token is desired. The request at step 719 may include an updated native library identifier associated with the updated version of the native library. At step 722, server 702 encrypts the token or LUK using an updated transport key embedded in the updated version of the native library. At step 725, server 702 transmits the encrypted token or LUK data to portable communication device 720. At step 728, portable communication device 720 decrypts the token or LUK using the updated transport key and stores the requested token or LUK for use in future transactions.

In some embodiments, instead of encrypting/decrypting the token or LUK using the transport key directly, a one-time key or derived key generated from the transport key as described herein can be used instead.

Figure 8:
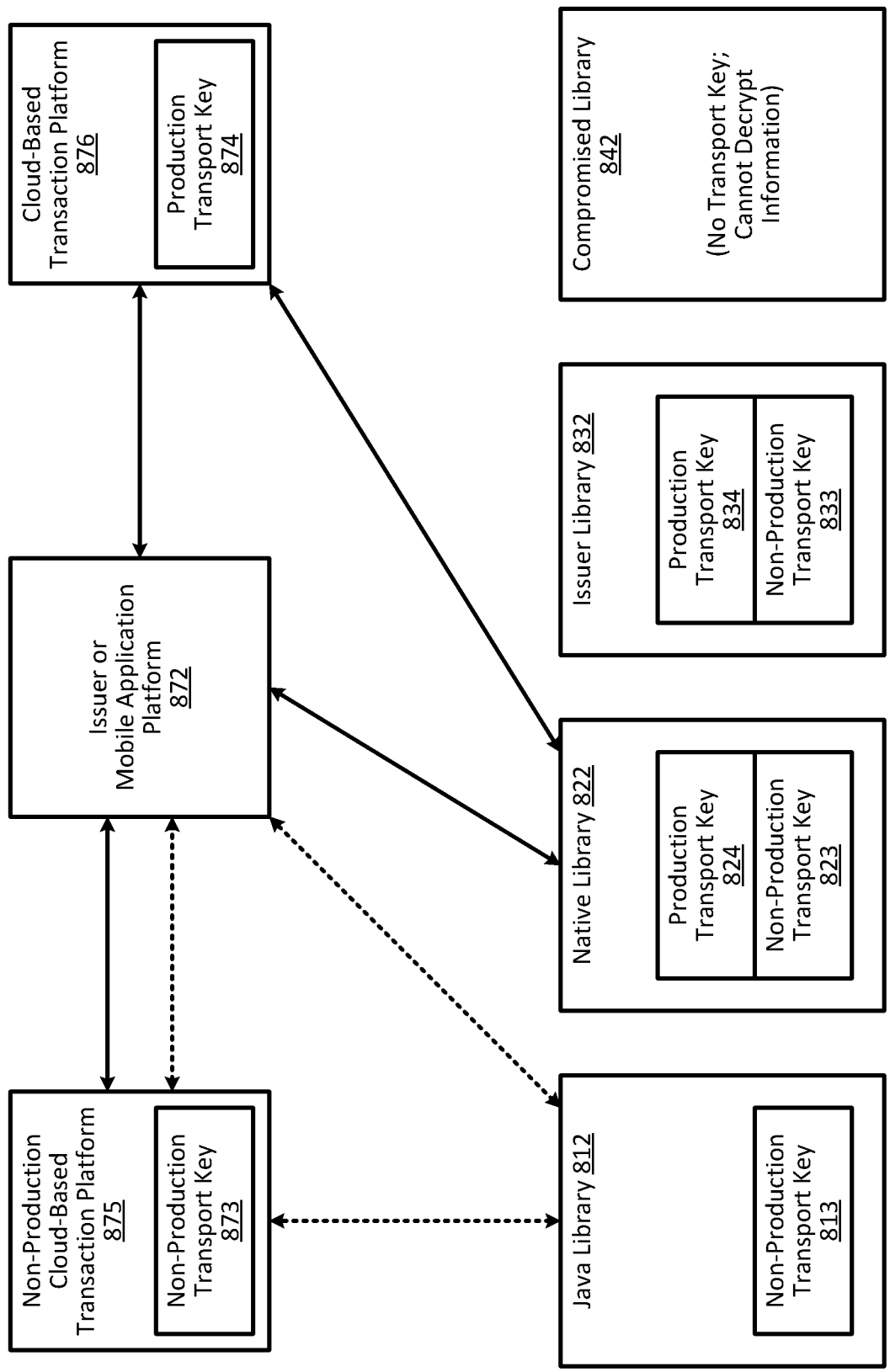
FIG. 8 illustrates a block diagram of a software environment, according to some embodiments.

In some embodiments, the concept of binding a transport key to a piece of software (e.g., a software library) can be used to facilitate testing of pre-production software. FIG. 8 illustrates a block diagram of a software environment, according to some embodiments. The software environment may include a cloud-based transaction platform 876 that facilitates cloud-based transaction services for a portable communication device and an issuer or mobile applications platform 872 associated with the cloud-based transaction platform 876. The software environment may also include a non-production cloud-based transaction platform 875 (e.g., a development sandbox) that is used for performing pre-production software testing of a mobile application.

The pre-production software may be implemented as a Java library 812 that is deployed to a selected number of portable communication devices for testing purposes. In some embodiments, the Java library 812 may lack binary protection, and debugging of the Java library 812 is allowed. Java library 812 may include a non-production transport key 813 that is used to encrypt communications between Java library 812 and non-production cloud-based transaction platform 875, which has its own non-production transport key 873.

When the Java library 812 becomes production ready, a production native library 822 that implements the same functionality as the Java library 812 can be deployed. The production native library 822 may include both the non-production transport key 823 as well as the production transport key 824 that is used to encrypt communications with the production cloud-based transaction platform 876. The binary of the native library 822 can be fully protected, and debugging of the native library 822 may not be allowed. In some embodiments, the issuer may also maintain an issuer library 832 that has the same functionalities and privileges as the native library 822.

In such a software environment, a comprised library 842 that contains malicious code may not have any transport key (production or non-production), and thus a compromised library 842 would not be able to decrypt encrypted information received from an issuer, a mobile application platform, or a cloud-based transaction platform.

Figure 9:
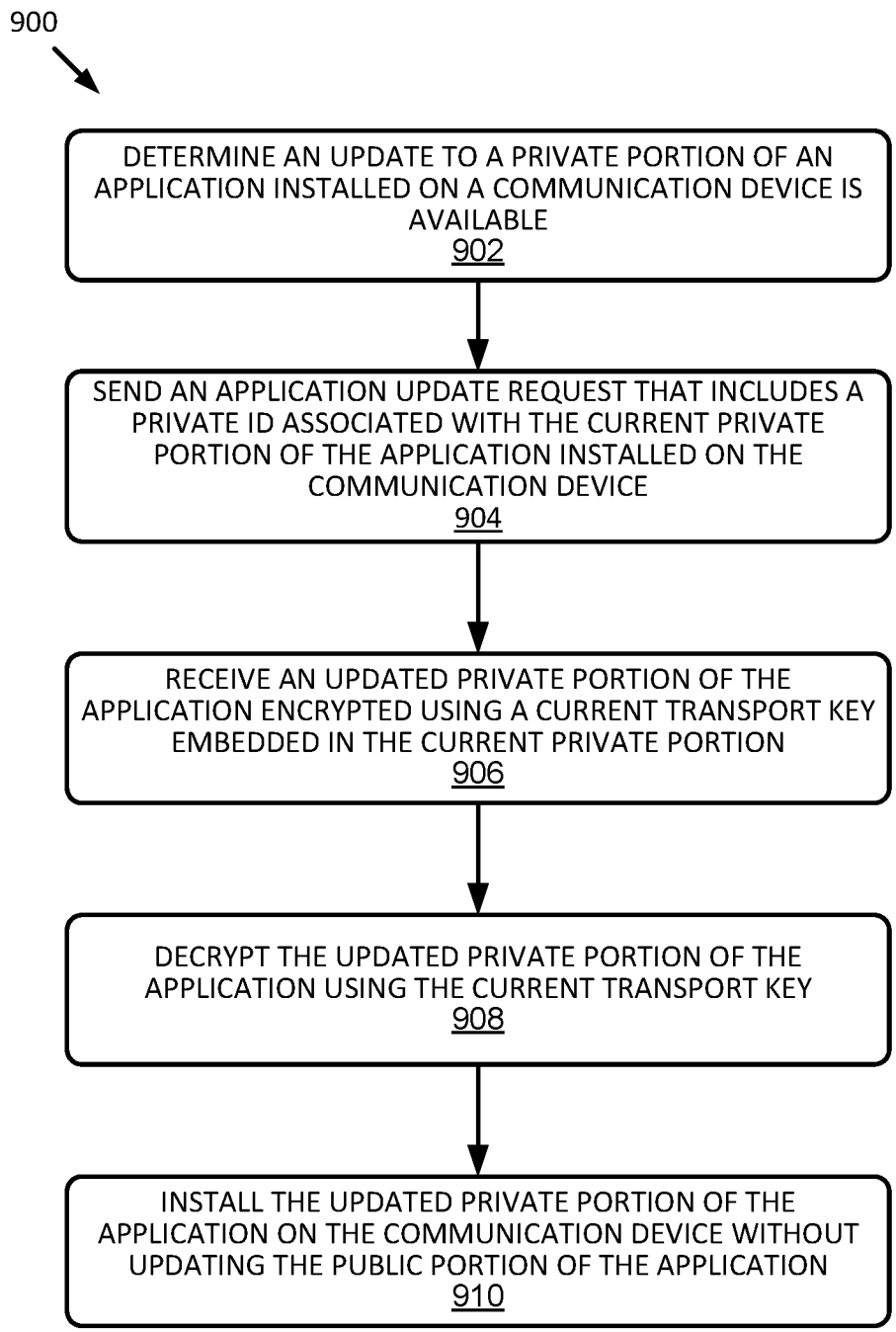
FIG. 9 illustrates a flow diagram of a method for updating an application, according to some embodiments.

FIG. 9 illustrates a flow diagram of a process 900 for updating an application installed on a communication device, according to some embodiments. In some embodiments, the application is partitioned into a public portion and a private portion. At block 902, process 900 determines that an update to a private portion of the application (e.g., a mobile application) installed on the computing device (e.g., a portable communication device) is available. This can be achieved, for example, by the communication device periodically contacting a server (e.g., a mobile application sever) to verify if the application installed on the communication is the most up to date, or by a server pushing a notification message to the communication device to notify that a new version of the private portion of the application is available.

At block 904, the communication device may send an application update request to a server that hosts the application updates. The application update request may include a private portion identifier that is associated with the private portion of the application currently installed on the communication device. The private portion identifier can be used by the server to verify that a valid application is currently installed on the computing device before sending any updates to the communication device. The private portion identifier can also be associated with a transport key that the server can use to encrypt information sent to the communication device. If the communication device is compromised with malicious code, it is unlikely that the malicious code would have a valid private portion identifier or have access to a valid transport key to decrypt information sent from the server.

At block 906, the communication device receives an updated private portion of the application from the server. The updated private portion can be encrypted by the server using a transport key associated with the private portion identifier. At block 908, the communication device may decrypt the received updated private portion of the application using the transport key of the currently installed private portion of the application at the communication device. In some embodiments, the updated private portion can be encrypted at the server by the transport key itself, and the communication device can decrypt the updated private portion using its own transport key. In some embodiments, the header of a message from the server can be encrypted by the transport key to generate a one-time key, and the updated private portion of the application can be encrypted by this one-time key. In some embodiments, the server may combine a key derivation seed with the transport key to generate a derived key, and the updated private portion of the application can be encrypted by this generated derived key. The key derivation seed can be shared with the communication device to allow the communication device to generate its own derived key to decrypt the received updated private portion of the application.

At block 910, after the communication device has properly decrypted the received updated private portion, the communication device may install the updated private portion onto the communication device. The installation can be performed without updating the public portion of the application, and hence the application can be updated without having to download and update the entire application.

In some embodiments, when the communication device communicates with the server via the application, the communications (e.g., to exchange sensitive data such as a token or LUK) can be encrypted using the latest transport key embedded in the private portion of the application currently installed on the communication device. As the private portion is updated, the transport key can be updated as well. In this manner, a compromised transport key will become useless once a new update to the private portion is released.

It should be noted that although the techniques described herein have been described with reference to updating a private portion of an application, the techniques described herein can also be used to update any portion of an application (e.g., a native library, Java library, etc.) without having to update the entire application.

Any of the computing devices, communication devices, computers, servers, and the like described herein can be implemented using one or more processors coupled to a memory that store code or instructions, which when executed by the one or more processors, cause the device to perform one or more of the methods and processes described herein. Memory, storage media, and computer-readable media for containing code, or portions of code described herein, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Embodiments of the invention are not limited to the above-described embodiments. For example, although separate functional blocks are shown for an issuer, transaction processing network, and acquirer, some entities may perform a combination or all of these functions and may be included in some embodiments.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A communication device comprising:
    a processor; and
    a memory coupled to the processor, the memory storing instructions, which when executed by the processor, cause the communication device to perform operations including:
        determining that an update for a first portion of an application installed on the communication device is available at a server;
        sending a request for the update to the server, wherein the request for the update includes a current identifier associated with a current version of the first portion of the application installed on the communication device, and wherein the current identifier and a current transport key are embedded in the current version of the first portion of the application installed on the communication device;
        receiving an updated version of the first portion of the application from the server, wherein an updated transport key is embedded in the updated version of the first portion of the application;
        installing the updated version of the first portion of the application; and
        subsequent to installing the updated version of the first portion of the application:
            sending a data request to the server, the data request including an updated identifier associated with the updated version of the first portion of the application;
            receiving the data encrypted by the server using the updated transport key that was embedded in the updated version of the first portion of the application; and
            decrypting the received data using the updated transport key.

2. The communication device of claim 1, wherein the updated version of the first portion of the application received from the server is encrypted using the current transport key, and the operations further include decrypting the updated version of the first portion of the application using the current transport key embedded in the current version of the first portion of the application installed on the communication device.

3. The communication device of claim 1, wherein the operation of decrypting the received data includes generating a decryption key using the updated transport key, and decrypting the received data with the decryption key.

4. The communication device of claim 3, wherein the received data is received in a message that includes a header and a payload containing the received data, and the decryption key for decrypting the received data is generated by encrypting the header with the updated transport key.

5. The communication device of claim 3, wherein the decryption key for decrypting the received data is generated by using the updated transport key and a key derivation seed received from the server.

6. The communication device of claim 1, wherein the operation of determining that the update for the first portion of the application is available at the server includes contacting the server to determine a most up-to-date version of the application.

7. The communication device of claim 1, wherein the operation of determining that the update for the first portion of the application is available at the server comprises:
    receiving a message notifying that the update for the first portion is available.

8. The communication device of claim 1, wherein the current version of the first portion of the application is obfuscated using a first obfuscation seed, and the updated version of the first portion of the application is obfuscated using a second obfuscation seed that is different than the first obfuscation seed.

9. The communication device of claim 1, wherein the application further includes a second portion, and wherein the first portion of the application is written in a first programming language, and the second portion of the application is written in a second programming language that is different than the first programming language.

10. A method for updating an application installed on a communication device, wherein the application includes a first portion and a second portion, the method comprising:
    determining that an update for the first portion of the application installed on the communication device is available at a server;
    sending a request for the update to the server, wherein the request for the update includes a current identifier associated with a current version of the first portion of the application installed on the communication device, and wherein the current identifier and a current transport key are embedded in the current version of the first portion of the application installed on the communication device;

receiving an updated version of the first portion of the application from the server, wherein an updated transport key is embedded in the updated version of the first portion of the application;

installing the updated version of the first portion of the application; and subsequent to installing the updated version of the first portion of the application:

sending a data request to the server, the data request including an updated identifier associated with the updated version of the first portion of the application;

receiving the data encrypted by the server using the updated transport key that was embedded in the updated version of the first portion of the application; and decrypting the received data using the updated transport key.

11. The method of claim 10, wherein the updated version of the first portion of the application received from the server is encrypted using the current transport key, and the method further includes decrypting the updated version of the first portion of the application using the current transport key embedded in the current version of the first portion of the application installed on the communication device.

12. The method of claim 10, wherein decrypting the received data includes generating a decryption key using the updated transport key, and decrypting the received data with the decryption key.

13. The method of claim 12, wherein the received data is received in a message that includes a header and a payload containing the received data, and the decryption key for decrypting the received data is generated by encrypting the header with the updated transport key.

14. The method of claim 12, wherein the decryption key for decrypting the received data is generated by using the updated transport key and a key derivation seed received from the server.

15. The method of claim 10, wherein the current version of the first portion of the application is obfuscated using a first obfuscation seed, and the updated version of the first portion of the application is obfuscated using a second obfuscation seed that is different than the first obfuscation seed.

16. The method of claim 10, wherein the first portion of the application is written in a first programming language, and the second portion of the application is written in a second programming language that is different than the first programming language.

17. A method for updating an application installed on a communication device, wherein the application includes a first portion and a second portion, the method comprising:

receiving, by a server, a request for an update to the first portion of the application from the communication device, wherein the request for the update includes a current identifier associated with a current version of the first portion of the application installed on the communication device, and wherein the current identifier and a current transport key are embedded in the current version of the first portion of the application installed on the communication device;

transmitting, by the server, an updated version of the first portion of the application to the communication device, wherein an updated transport key is embedded in the updated version of the first portion of the application; and subsequent to the communication device installing the updated version of the first portion of the application:

receiving, by the server, a data request from the communication device, the data request including an updated identifier associated with the updated version of the first portion of the application;

encrypting, by the server, the data using the updated transport key that was embedded in the updated version of the first portion of the application; and transmitting, by the server, the encrypted data to the communication device, wherein the encrypted data is decrypted by the communication device using the updated transport key.

18. The method of claim 17, further comprising:

determining, by the server, the current transport key based on the current identifier in the request for the update; and encrypting, by the server, the updated version of the first portion of the application using the current transport key prior to sending the updated version of the first portion of the application to the communication device.

19. The method of claim 17, wherein the encrypted data is decrypted by the communication device using a decryption key generated from the updated transport key.

20. The method of claim 19, wherein the encrypted data is transmitted in a message that includes a header and a payload containing the encrypted data, and the decryption key for decrypting the encrypted data is generated by encrypting the header with the updated transport key.

* * * * *